(12) United States Patent
Hayakawa et al.

(10) Patent No.: US 12,179,743 B2
(45) Date of Patent: Dec. 31, 2024

(54) MOVING OBJECT DETERMINATION DEVICE

(71) Applicants: DENSO CORPORATION, Kariya (JP); TOYOTA JIDOSHA KABUSHIKI KAISHA, Toyota (JP)

(72) Inventors: Yoshiki Hayakawa, Kariya (JP); Masumi Fukuman, Aichi-ken (JP); Akihiro Kida, Toyota (JP); Kunihiro Sugihara, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 17/658,975

(22) Filed: Apr. 12, 2022

(65) Prior Publication Data

US 2022/0234573 A1 Jul. 28, 2022

Related U.S. Application Data (63) Continuation of application No. PCT/JP2020/036357, filed on Sep. 25, 2020.

(30) Foreign Application Priority Data

Oct. 14, 2019 (JP) .................................. 2019-188279

(51) Int. Cl.
*B60W 30/06* (2006.01)
*B60W 40/02* (2006.01)

(52) U.S. Cl.
CPC ............ *B60W 30/06* (2013.01); *B60W 40/02* (2013.01); *B60W 2420/54* (2013.01);
(Continued)

(58) Field of Classification Search
CPC ...... B60W 10/06; B60W 10/18; B60W 30/06; B60W 30/09; B60W 30/0956;
(Continued)

(56) References Cited

U.S. PATENT DOCUMENTS

| 2004/0059503 A1* | 3/2004 | Peters ...................... G08G 1/08 701/96 |
| 2016/0084958 A1* | 3/2016 | Kim ........................ G01S 7/521 367/100 |
| 2020/0111368 A1* | 4/2020 | Park ...................... B60W 40/04 |

FOREIGN PATENT DOCUMENTS

| JP | 2013-20458 A | 1/2013 |
| JP | 2016-85484 A | 5/2016 |

* cited by examiner

*Primary Examiner* — Peter D Nolan
*Assistant Examiner* — Ce Li Li
(74) *Attorney, Agent, or Firm* — MASCHOFF BRENNAN (57) ABSTRACT

A moving object determination device applied to a vehicle, the device includes at least a predicted time calculation unit, a time difference calculation unit, and a moving/stationary determination unit. The predicted time calculation unit calculates a predicted time from when an obstacle starts to be detected by the first sensor to when the obstacle will no longer be detected by the second sensor based on a traveling speed of the obstacle and a length of the obstacle. The time difference calculation unit calculates a real time from when the obstacle has been detected by the first sensor to when the obstacle has no longer been detected by the second sensor, and calculates a time difference between the real time and the predicted time. The moving/stationary determination unit determines that the obstacle is a stationary object in response to the time difference being equal to or greater than a predetermined value.

8 Claims, 8 Drawing Sheets

(52) U.S. Cl.
CPC ..... *B60W 2540/18* (2013.01); *B60W 2554/20* (2020.02); *B60W 2554/40* (2020.02); *B60W 2554/80* (2020.02); *B60W 2756/10* (2020.02)

(58) Field of Classification Search
CPC ................ B60W 40/02; B60W 40/04; B60W 2420/403; B60W 2420/408; B60W 2420/54; B60W 2540/18; B60W 2554/00; B60W 2554/20; B60W 2554/40; B60W 2554/4041; B60W 2554/80; B60W 2754/30; B60W 2756/10; G01S 7/521; G01S 7/534; G01S 15/102; G01S 15/32; G01S 15/86; G01S 15/87; G01S 15/93; G01S 15/931; G01S 2015/933; G01S 2015/936; G01S 2015/938; G08G 1/16; G08G 1/167

See application file for complete search history.

MOVING OBJECT DETERMINATION DEVICE

CROSS-REFERENCE TO RELATED APPLICATION

The present application is a continuation application of International Application No. PCT/JP2020/036357, filed Sep. 25, 2020, which claims priority to Japanese Patent Application No. 2019-188279, filed in Japan on Oct. 14, 2019. The contents of these applications are incorporated herein by reference in their entirety.

BACKGROUND

1. Technical Field

The present disclosure relates to a moving object determination device that determines whether an object is a moving object or a stationary object using an ultrasonic sensor provided in a vehicle.

2. Related Art

An in-vehicle object distinguishing device is known to determine whether an object near the vehicle is a moving object or a stationary object. This device uses a plurality of ultrasonic sensors to perform detection within the same area at different moments, and determines whether an object is a moving object or a stationary object by determining that the object is a stationary object when the detection results are the same and determining that the object is a moving object when the detection results are different.

SUMMARY

The present disclosure provides a moving object determination device. As an aspect of the present disclosure, a moving object determination device includes at least a predicted time calculation unit, a time difference calculation unit, and a moving/stationary determination unit. The predicted time calculation unit calculates a predicted time from when an obstacle starts to be detected by the first sensor to when the obstacle will no longer be detected by the second sensor based on a traveling speed of the obstacle and a length of the obstacle. The time difference calculation unit calculates a real time from when the obstacle has been detected by the first sensor to when the obstacle has no longer been detected by the second sensor, and calculates a time difference between the real time and the predicted time. The moving/stationary determination unit determines that the obstacle is a stationary object in response to the time difference being equal to or greater than a predetermined value.

DETAILED DESCRIPTION OF THE PREFERRED EMBODIMENTS

Conventionally, JP 2013-20458 A (published unexamined patent application) proposes an in-vehicle object distinguishing device that determines whether an object near the vehicle is a moving object or a stationary object. This device uses a plurality of ultrasonic sensors to perform detection within the same area at different moments, and determines whether an object is a moving object or a stationary object by determining that the object is a stationary object when the detection results are the same and determining that the object is a moving object when the detection results are different. The device thereby creates an obstacle map showing only the stationary objects in order to construct a parking support system.

However, even when a moving object stops while an ultrasonic sensor is performing detection within the same area at different moments, the device shown in JP 2013-20458 A continues to determine that the object is a moving object. This creates inconsistency in the obstacle map, which may cause the parking support system such as an automatic parking system to derive an incorrect route or fall into an uncontrolled state where no control is performed.

One or more aspects of the present disclosure are directed to provide a moving object determination device capable of correctly identifying a stationary object even when a moving object becomes a stationary object in moving.

A moving object determination device according to an aspect of the present disclosure is a device applied to a vehicle that has two ultrasonic sensors aligned in a traveling direction of the vehicle with a predetermined distance between them and configured to detect an obstacle on one side of the host vehicle. The device includes a first determination unit, a second determination unit, a speed calculation unit, a length calculation unit, a predicted time calculation unit, a time difference calculation unit, and a moving/stationary determination unit. The first determination unit determines whether an obstacle is detected by one of at least two ultrasonic sensors that are aligned in a traveling direction of the vehicle on one side of the vehicle with a predetermined distance between them. The second determination unit determines whether the obstacle has been detected by a second sensor which is one of at least two ultrasonic sensors that did not detect the object, the ultrasonic sensor that detected the obstacle being defined as a first sensor. The speed calculation unit calculates a traveling speed of the obstacle based on an elapsed time from when the first sensor started to detect the obstacle to when the second sensor started to detect the obstacle, and the predetermined distance. The length calculation unit calculates a length of the obstacle based on the traveling speed and the elapsed time. The predicted time calculation unit calculates a predicted time from when the obstacle starts to be detected by the first sensor to when the obstacle will no longer be detected by the second sensor based on the traveling speed and the length. The time difference calculation unit calculates a real time from when the obstacle has been detected by the first sensor to when the obstacle has no longer been detected by the second sensor, and calculates a time difference between the real time and the predicted time. The moving/stationary determination unit determines that the obstacle is a stationary object in response to the time difference being equal to or greater than a predetermined value, and determines that the obstacle is a moving object in response to the time difference being smaller than the predetermined value.

As described in the above paragraph, the detection results of at least two side sensors placed at a certain distance from each other on one side of the host vehicle are used to calculate the traveling speed and the length of the obstacle. Further, based on the traveling speed and the length, the predicted time from when the obstacle starts to be detected by the first sensor to when the obstacle will no longer be detected by the second sensor, in other words, a prediction of the time it takes for the obstacle to pass by the vehicle is calculated. The real time it actually took for the obstacle to pass by is compared with the predicted time, and if the real time is longer than the predicted time by a predetermined time or more, it can be determined that the obstacle has stopped moving. Thus, it is possible to correctly determine that an object is a stationary object even when a moving object changes to a stationary object in moving.

The reference signs in parentheses attached to the components or the like indicate examples of the correspondence between the components or the like and the specific components described in relation to the embodiments described below.

Embodiments of the present disclosure will be described below with reference to the drawings. In the following embodiments, parts of an embodiment that are the same as or equivalent to parts of another embodiment are assigned with the same reference signs.

First Embodiment

The first embodiment will be described. In the present embodiment, a case where the moving object determination device is incorporated in the parking support ECU (Electric Control Unit) of a parking support system provided in a vehicle will be described as an example. Although the moving object determination device is incorporated in a parking support system in this example, it may be incorporated in a system other than a parking support system.

Figure 1:
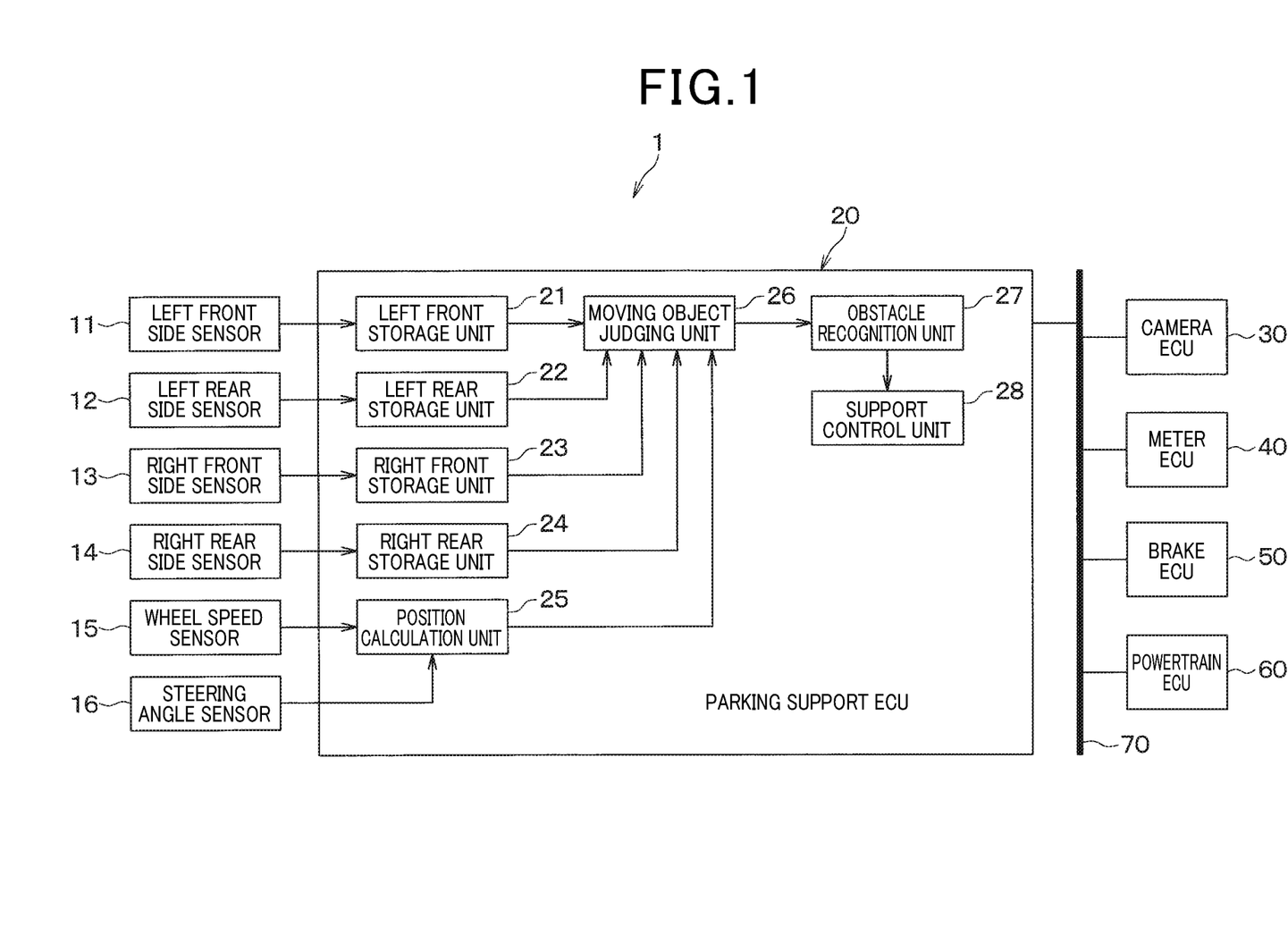
FIG. 1 is a block diagram of a parking support system according to the first embodiment of the present disclosure.

As shown in FIG. 1, the parking support system 1 has various sensors 11 to 16, a parking support ECU 20, a camera ECU 30, a meter ECU 40, a brake ECU 50, and a powertrain ECU 60. The various sensors 11 to 16 and the parking support ECU 20 are directly connected so that the detection signals of the various sensors 11 to 16 are input to the parking support ECU 20. The parking support ECU 20 can communicate with the camera ECU 30, the meter ECU 40, the brake ECU 50, and the powertrain ECU 60 via an in-vehicle communication bus 70 such as an in-vehicle LAN (Local Area Network).

The various sensors 11 to 16 include a left front side sensor 11, a left rear side sensor 12, a right front side sensor 13, a right rear side sensor 14, a wheel speed sensor 15, and a steering angle sensor 16.

Figure 2:
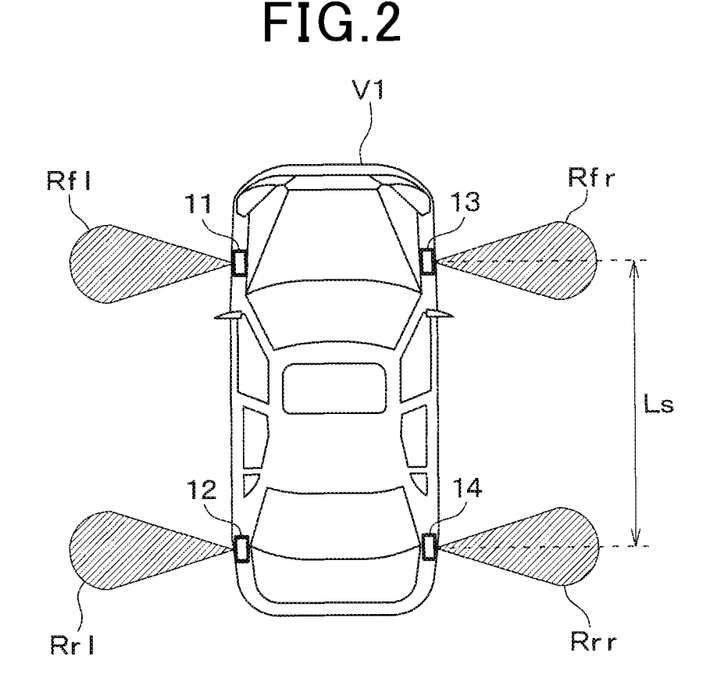
FIG. 2 is a diagram showing a vehicle equipped with side sensors and their detection areas.

As shown in FIG. 2, the left front side sensor 11, the left rear side sensor 12, the right front side sensor 13, and the right rear side sensor 14 are ultrasonic sensors aligned in the traveling direction of the host vehicle V1 on the respective sides of the host vehicle V1. In this embodiment, ultrasonic sensors are provided in the left front, left rear, right front, and right rear parts of the host vehicle V1. Each ultrasonic sensor generates an ultrasonic wave and receives the reflected wave, and detects the distance to an object in the direction in which the ultrasonic sensor is oriented based on the time from the generation of the ultrasonic wave to the reception of the reflected wave. The ultrasonic sensors output the obtained results as detection signals. Hereinafter, the distance obtained by an ultrasonic sensor is referred to as a detected distance. Further, as shown in FIG. 2, the detection area of the left front side sensor 11 is denoted by Rfl, the detection area of the left rear side sensor 12 is denoted by Rrl, the detection area of the right front side sensor 13 is denoted by Rfr, and the detection area of the right rear side sensor 14 is denoted by Rrr.

The interval between the left front side sensor 11 and the left rear side sensor 13 and the interval between the right front side sensor 12 and the right rear side sensor 14 have the same predetermined distance Ls as shown in FIG. 2. For example, the left front side sensor 11 and the right front side sensor 13 are placed in the front wheel wells of the host vehicle V1. The left rear side sensor 12 and the right rear side sensor 14 may be placed in the side parts of the rear bumper of the host vehicle V1 or the rear fenders. The left front side sensor 11, the left rear side sensor 12, the right front side sensor 13, and the right rear side sensor 14 are each oriented toward an area on the left or right of the host vehicle V1 to measure the distance to an object on the left or right of the host vehicle V1.

The wheel speed sensor 15 generates a detection signal according to the rotation state of the wheels as a pulse output. The wheel speed sensor 15 is actually provided for each of the four wheels, but it is illustrated as a single sensor in FIG. 1.

The steering angle sensor 16 outputs a detection signal according to the steering direction and the amount of steering operation.

The parking support ECU 20 has a microcomputer including components such as a CPU, ROM, RAM, and I/O, and functions as a control unit that carries out parking support control based on the detection signals from the various sensors 11 to 16 described above. In the parking support control, obstacles such as stationary objects near the vehicle are recognized, a route for parking the vehicle avoiding the obstacles is calculated, and support is provided for moving the vehicle along the route. If the recognized obstacle is a moving object, the moving object may be already gone when the parking of the vehicle is started after recognizing the moving object. The control includes an operation for tackling this, such as excluding the moving object(s) from the obstacles before calculating the route. Then, to assist in moving the vehicle along the route, for example, the route may be visually provided to the driver, or the driving force may be controlled to directly move the vehicle along the route. In order to execute the control, control signals are transmitted from the parking support ECU 20 to the camera ECU 30, the meter ECU 40, the brake ECU 50, and the powertrain ECU 60 via the in-vehicle communication bus 70.

Specifically, the parking support ECU 20 has, as functional units, a left front storage unit 21, a left rear storage unit 22, a right front storage unit 23, a right rear storage unit 24, a position calculation unit 25, a moving object determination unit 26, an obstacle recognition unit 27, and a support control unit 28.

The left front storage unit 21, left rear storage unit 22, right front storage unit 23, and right rear storage unit 24 receive the detection signals of the left front side sensor 11, left rear side sensor 12, right front side sensor 13, and right rear side sensor 14, respectively. Each of the storage units 21 to 24 calculates the location of the object using the moving triangulation method based on the distance the vehicle has traveled and the detected distance indicated by the detection signal input from the corresponding one of the side sensors 11 to 14, and also stores the detected distance. For example, the moving triangulation method includes operations such as determining that there is an object ahead of the ultrasonic sensor if the detected distance decreases when the ultrasonic sensor moves forward, and determining that the object is on the left or right of the ultrasonic sensor if the detected distance does not change.

Based on the detection signals of the wheel speed sensor 15 and the steering angle sensor 16, the position calculation unit 25 determines the distance traveled by the host vehicle, whether the vehicle was turning, and the like. In this example, the distance traveled by the host vehicle is calculated based on the number of pulse signals from the wheel speed sensor 15 and the wheel diameter. However, the method of obtaining the distance traveled by the host vehicle is not limited to this, and alternatively, for example, it may be calculated from the vehicle speed obtained from the vehicle speed sensor and the traveling time. Further, the position calculation unit 25 determines, in addition to the absolute value of the steering angle, whether the vehicle is turning based on the steering angle sensor 16 at each timing, and memorizes the periods during which the vehicle was turning.

The moving object determination unit 26 determines whether the detected object is a moving object or a stationary object, and transmits the result to the obstacle recognition unit 27. Whether there is an obstacle object or not can be determined based on the detected distance stored in each of the storage units 21 to 24. Specifically, when a detected distance is obtained from the detection signal of the corresponding one of the side sensors 11 to 14, it means that there is an object, and when a detected distance is not obtained, it means that there is no object. Therefore, whether there is an object can be determined based on whether a detected distance has been obtained. When a detected distance is obtained and an object is detected, it is determined whether the object is a moving object or a stationary object. The details of the method for determining whether the detected object is a moving object or a stationary object will be described later.

The obstacle recognition unit 27 recognizes presence of the obstacle object based on the detected distance(s) stored in one or more of the storage units 21 to 24, and transmits information on the obstacle to the support control unit 28. At this time, the obstacle recognition unit 27 adds information indicating whether the object is a moving object or a stationary object based on the result of determination of whether the object is a moving object or a stationary object transmitted from the moving object determination unit 26. If the detected object is a moving object, the moving object may be already gone when the parking of the vehicle is started after recognizing the moving object. Therefore, information indicating whether the obstacle is a moving object or a stationary object is attached, and the information on the obstacle is transmitted to the support control unit 28.

The support control unit 28 performs parking support control so that the vehicle can be parked avoiding obstacles based on the information on the obstacles transmitted from the obstacle recognition unit 27. For example, the support control unit 28 excludes moving objects from the obstacles as they should have already moved away when the vehicle is parked, and calculates the route so that the stationary obstacle objects are avoided. Then, in order to support the movement of the vehicle along the route, control signals are output as appropriate to the camera ECU 30, the meter ECU 40, the brake ECU 50, and the powertrain ECU 60 via the in-vehicle communication bus 70.

The camera ECU 30 receives surround view data showing the vicinity of the host vehicle V1 captured by a surround view camera (not shown), and combines the surround view data with an image of the host vehicle V1 and displays them on a display (not shown) when parking the vehicle. For example, the camera ECU 30 combines the movement of the host vehicle V1 as a bird's-eye view image with the surround view data and displays them on the display. When the camera ECU 30 receives a control signal from the support control unit 28, the camera ECU 30 indicates the planned parking position of the host vehicle V1 in a bird's-eye view, indicates the route by an arrow, and/or highlights the detected obstacles.

The meter ECU 40 controls the indicators of various meters such as a vehicle speed indicator and an engine speed indicator. When the meter ECU 40 receives a control signal from the support control unit 28, the meter ECU 40 indicates or displays information related to parking support using an indicator or a display (not shown), or generates an alarm sound from an alarm unit (not shown). For example, the meter ECU 40 uses an indicator, a display, or an alarm unit to notify the driver of the action the vehicle is going to take such as "the vehicle is moving forward" or "the vehicle is backing up", or issues instructions to prepare for automatic parking such as "please set the shift position to 'D'".

The brake ECU 50 forms a braking control device that performs various brake controlling operations. The brake ECU drives an actuator for controlling the brake fluid pressure to automatically generate brake fluid pressure, and generates a braking force by applying pressure to each wheel cylinder. When the brake ECU 50 receives a control signal from the support control unit 28, the brake ECU 50 controls the braking force of each wheel so as to move the vehicle along the route.

The powertrain ECU 60 forms a driving force control device that performs various driving force controlling operations, and generates the desired driving force by controlling the engine or motor speed, and/or the transmission. When the powertrain ECU 60 receives a control signal from the support control unit 28, the powertrain ECU 60 controls the driving force of the drive wheels so as to move the vehicle along the route.

In this example, the brake ECU 50 and the powertrain ECU 60 are included in a system capable of performing automatic parking. The camera ECU 30 is included to display a bird's-eye view, and the meter ECU 40 is included to indicate information related to parking support. However, these are not essential components and can be selectively used as appropriate and needed.

The parking support system according to the present embodiment is configured in such a manner. Next, the method for determining whether the detected object is a moving object or a stationary object performed by the moving object determination unit 26 will be described.

First, an example of a situation where whether an object is a moving object or a stationary object is determined is described. In FIGS. 3A to 3D and 4 described below, the arrows indicate the direction in which the vehicle is moving and that the vehicle is moving. When there is no arrow, the vehicle is stopped.

Figure 3A:
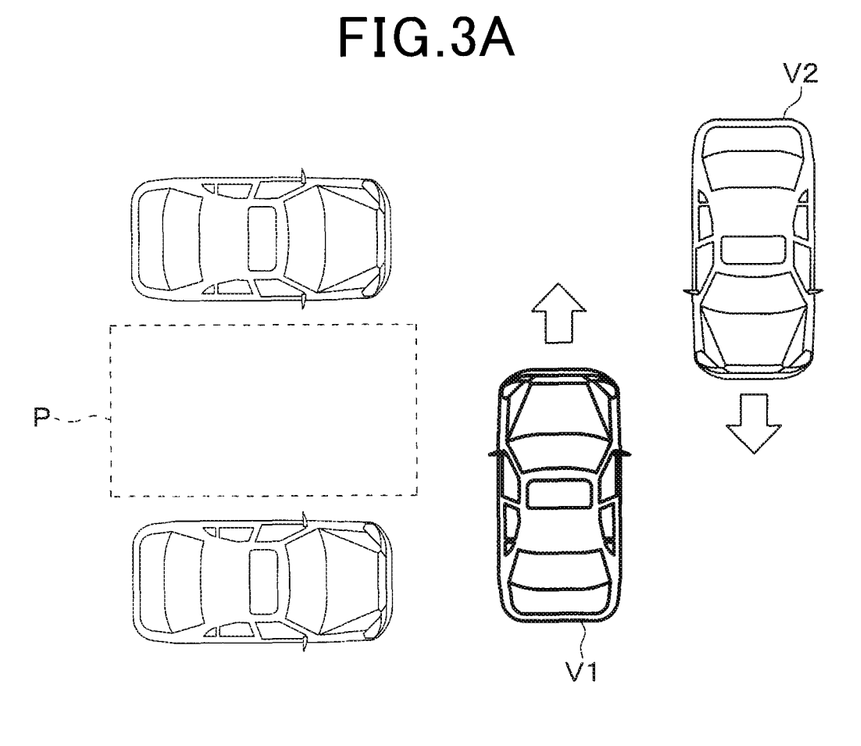
FIG. 3A is a diagram showing a situation where the host vehicle is about to be parked and another vehicle passes by the host vehicle.

For example, as shown in FIG. 3A, it is assumed that the host vehicle V1 is moving upward to park the host vehicle V1 in the parking space P of a parking lot surrounded by the broken line, and the host vehicle passes by an oncoming vehicle V2 moving downward. In this case, as shown in FIG. 3B, when the other vehicle V2 enters the detection areas Rfr and Rrr of the right front side sensor 13 and the right rear side sensor 14 of the host vehicle V, the side sensors 13 and 14 detect the other vehicle V2.

Figure 3B:
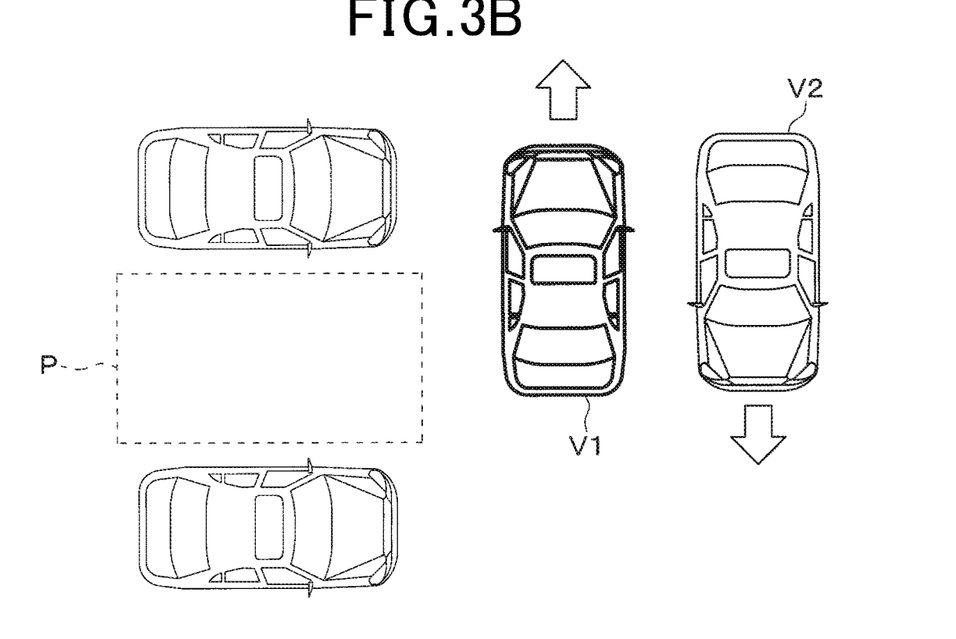
FIG. 3B is a diagram showing a state following the state of FIG. 3A.
Figure 3C:
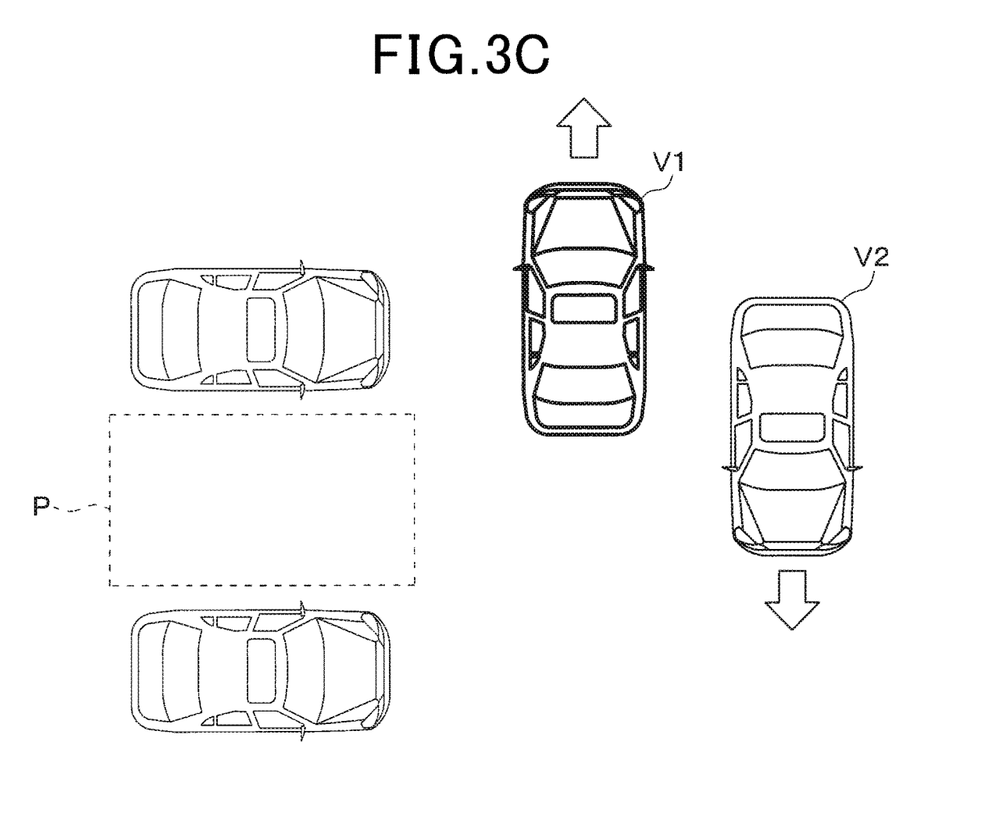
FIG. 3C is a diagram showing a case where the other vehicle keeps on moving after FIG. 3B.
Figure 3D:
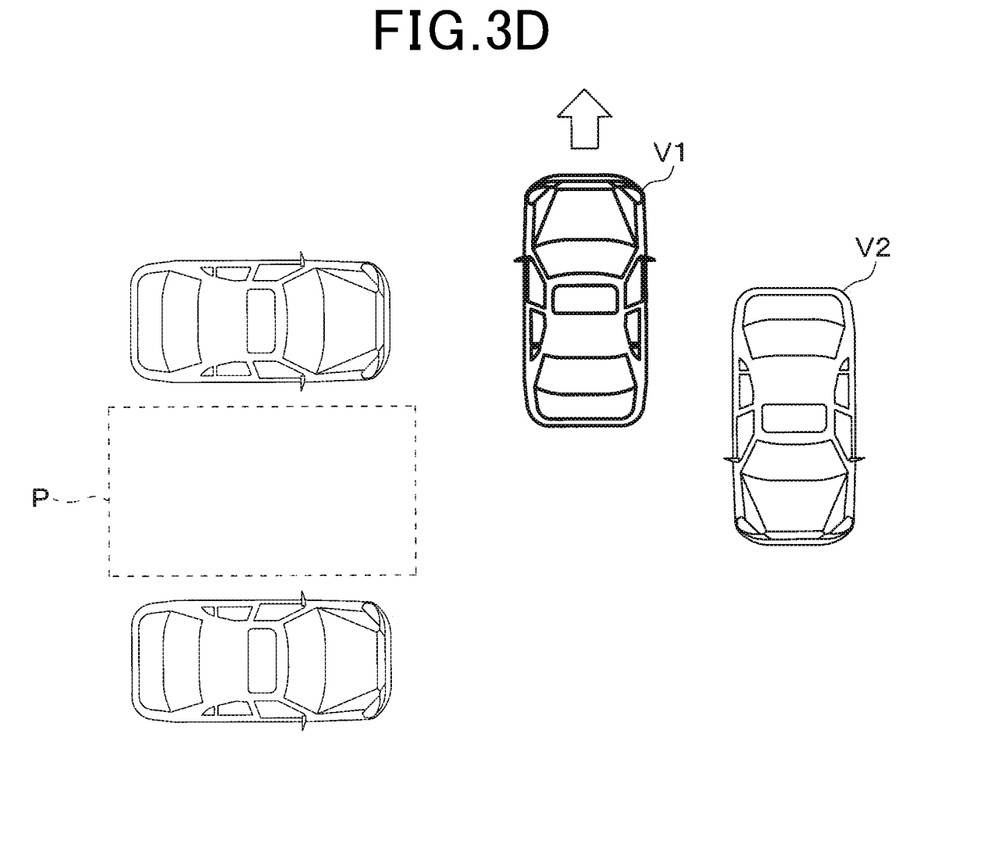
FIG. 3D is a diagram showing a case where the other vehicle stops after FIG. 3B.

After that, the other vehicle V2 may keep moving as shown in FIG. 3C, or stop as shown in FIG. 3D.

At this time, if detection is performed within the same area at different moments as in JP 2013-20458 A described above, in both of the cases of FIGS. 3C and 3D, the object is once detected as a moving object according to the state of FIG. 3B. Therefore, even if the other vehicle V2 stops after that as shown in FIG. 3D, the other vehicle V2 will continue to be detected as a moving object thereafter.

If the other vehicle V2 is a moving object, when the host vehicle V1 starts backing up to park itself in the parking space P, the other vehicle V2 is no longer near the host vehicle V1. Therefore, the other vehicle V2 can be excluded from the obstacles, and the optimum route can be derived including a route that passes through the place where the other vehicle V2 was.

On the other hand, when the other vehicle V2 is a stationary object, the stationary object is considered as an obstacle, and a route that avoids it is required. Therefore, it is not preferable that the other vehicle V2 continues to be determined as a moving object, and if the other vehicle V2 continues to be determined as a moving object even though it is a stationary object, the obstacle map becomes inconsistent, which may cause the system to derive an incorrect route or fall into an uncontrolled state where no control is performed.

Thus, it is necessary to correctly determine that an object is a stationary object even when a moving object changes to a stationary object during the process as shown in FIG. 3D. To this end, the present embodiment is configured to be capable of correctly determining whether another vehicle V2 is a moving object or a stationary object based on the detection results of the side sensors 11 and 12 and side sensors 13 and 14 provided on the left and right sides of the host vehicle V1, respectively.

Figure 4:
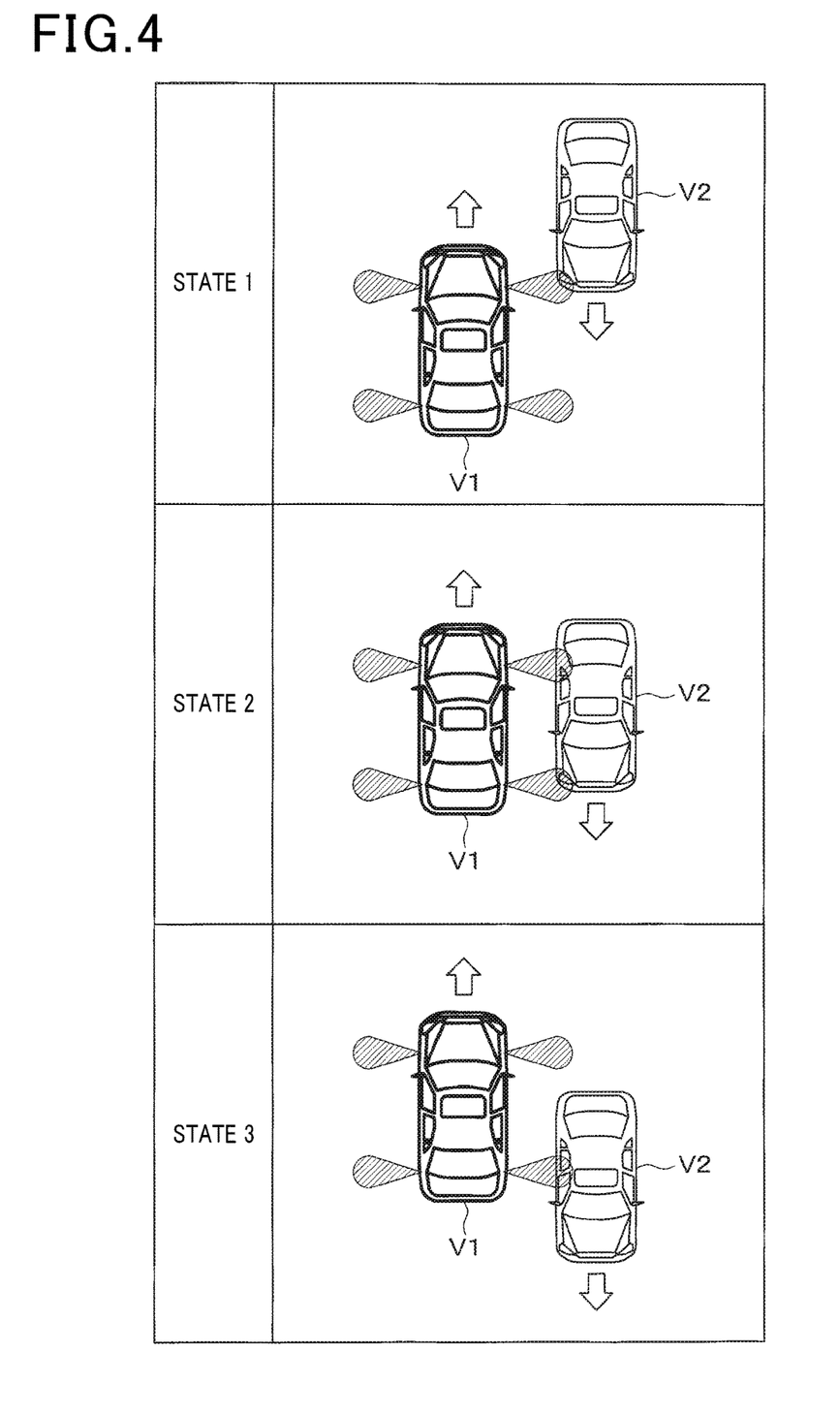
FIG. 4 is a diagram showing how the host vehicle and the other vehicle pass by each other in chronological order.

Specifically, in the state 1 of FIG. 4 where the host vehicle V1 and the other vehicle V2 are about to pass by each other, the right front side sensor 13 detects the other vehicle V2 first. Subsequently, the host vehicle V1 and the other vehicle V2 both keep moving, and the right rear side sensor 14 also detects the other vehicle V2 as in the state 2. When the host vehicle V1 and the other vehicle V2 still keep moving, at one point, the other vehicle gets out of the detection area Rfr of the right front side sensor 13 as in the state 3. Although not shown, if the host vehicle V1 and the other vehicle V2 still continue moving after that, the other vehicle gets out of the detection area Rrr of the right rear side sensor 14.

When such operations are performed, it is possible to predict the time it takes for the other vehicle V2 to pass by the host vehicle V1 if the vehicle speed VS2 and the length L2 of the other vehicle V2 can be known. In other words, it is possible to predict the time from when the right front side sensor 13 starts to detect the other vehicle to when it will no longer be detected by the right rear side sensor 14. Using this time period as the predicted time Tp, if the right front side sensor 13 or the right rear side sensor 14 still detects the other vehicle V2 even after the predicted time Tp, it can be considered that the other vehicle V2 stopped while it was passing by the host vehicle.

Considering this, the vehicle speed VS2 and the length L2 of the other vehicle V2 are estimated based on the detected distances from the side sensors 11 to 14, and the predicted time Tp it takes for the other vehicle V2 to pass by the host vehicle is calculated based on the estimated values. If it is confirmed that the other vehicle V2 is still in any of the detection areas Rfl to Rrr of the side sensors 11 to 14 even after the predicted time Tp has passed, the other vehicle V2 is determined to be a stationary object. Note that the predicted time Tp can be estimated more accurately by taking into account the widths of the detection areas Rfr and Rrr of the right front side sensor 13 and the right rear side sensor 14.

The vehicle speed VS2 and the length L2 of the other vehicle V2 are estimated based on the detection results of the pair of left or right side sensors 11 and 12 or 13 and 14 on the side on which the other vehicle V2 passes by.

Figure 5:
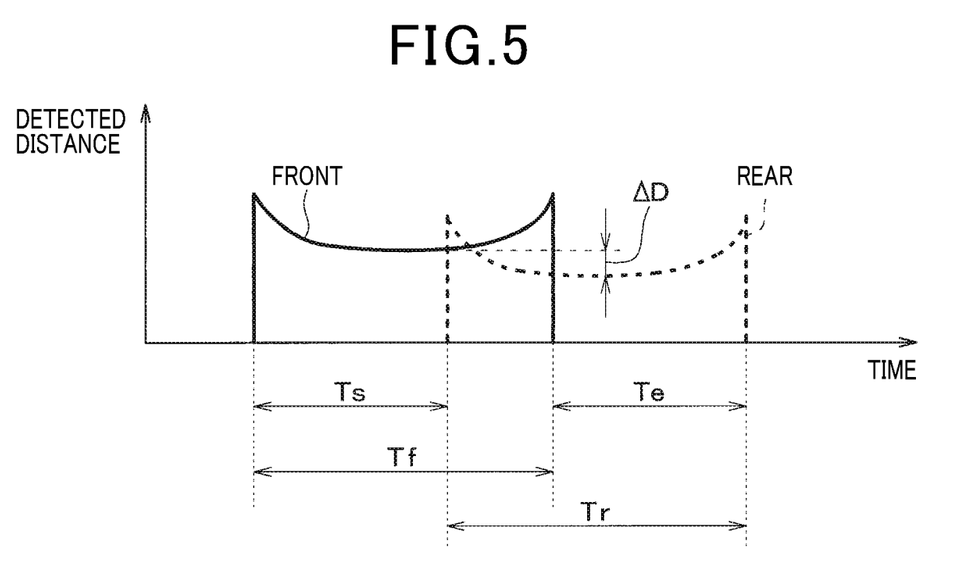
FIG. 5 is a diagram showing the detection results of the front side sensor and the rear side sensor when the two vehicles pass by each other as shown in FIG. 4.

For example, when the host vehicle V1 passes by the other vehicle V2 as shown in FIG. 4, the detected distances, i.e., the detection results from the right front side sensor 13 and the right rear side sensor 14 change as shown in FIG. 5.

First, when the other vehicle V2 enters the detection area Rfr of the right front side sensor 13, the right front side sensor 13 provides detected distances until the other vehicle V2 exits the detection area Rfr of the right front side sensor 13. Since the right front part of the front bumper of the other vehicle V2 first enters the detection area Rfr instead of the right side surface thereof, the first detected distance obtained by the right front side sensor 13 is larger than the detected distances to the right side surface. Similarly, since the right rear part of the rear bumper of the other vehicle V2 is the last part to exit the detection area Rfr, the last detected distance obtained by the right front side sensor 13 is larger than the detected distances to the right side surface.

The detected distance obtained by the right rear side sensor 14 when the other vehicle V2 enters the detection area Rrr of the right rear side sensor 14 changes similarly to the detected distance obtained when the other vehicle enters the detection area Rfr of the right front side sensor 13.

The distance Ls between the right front side sensor 13 and the right rear side sensor 14 has a predetermined value. Therefore, the vehicle speed SV2 of the other vehicle V2 can be calculated based on the elapsed time Ts from when the right front side sensor 13 starts to obtain a detected distance to when the right rear side sensor 14 starts to obtain a detected distance. To be precise, the timing at which the side sensor 13 or 14 starts to obtain a detected distance is not when the other vehicle V2 crosses the straight extension line extending to the right from the side sensor 13 or 14. However, since the spread of the detection area Rfr is the same as that of the detection area Rrr, the time interval between the instants at which they start detection can be considered to be equivalent to the time interval between the instants the other vehicle V2 crosses the straight extension lines extending to the right from the side sensors 13 and 14.

Specifically, first, the distance traveled LV1 by the host vehicle V1 at the elapsed time Ts is obtained. The distance traveled LV1 by the host vehicle V1 can be calculated based on the number of pulse signals transmitted from the wheel speed sensor 15 during the elapsed time Ts, the number of pulse signals per rotation of the tire, and the tire diameter. Alternatively, the distance traveled LV1 may be calculated from the vehicle speed SV1 of the host vehicle V1 and the elapsed time Ts.

Next, since the sum of the distance traveled LV1 by the host vehicle V1 and the distance traveled LV2 of the other vehicle V2 is the distance Ls, the distance traveled LV2 is calculated by subtracting the distance traveled LV1 from the distance Ls. Then, the vehicle speed SV2 of the other vehicle V2 can be obtained by dividing the distance traveled LV2 by the elapsed time Ts as in the following equation.

$$(Ls-LV1)/Ts=LV2/Ts=SV2 \quad (Eq. 1)$$

To obtain the length L2 of the other vehicle V2, first, the time Tf for which detected distances were obtained by the right front side sensor 13 is multiplied by the vehicle speed SV2 of the other vehicle V2 to calculate the amount of movement Y2 of the other vehicle V2 during the time Tf. Similarly, the amount of movement Y1 of the host vehicle V1 during the time Tf is calculated. The amount of movement Y1 of the host vehicle V1 can be calculated based on the number of pulse signals transmitted from the wheel speed sensor 15 during the time Tf, the number of pulse signals per rotation of the tire, and the tire diameter. Alternatively, the amount of movement Y1 may be calculated from the vehicle speed SV1 of the host vehicle V1 and the time Tf. The length L2 of the other vehicle V2 can be calculated by calculating the difference between the amount of movement Y2 of the other vehicle V2 and the amount of movement Y1 of the host vehicle V1 during the time Tf.

Once the vehicle speed SV2 and the length L2 of the other vehicle V2 are derived, the predicted time Tp it takes for the other vehicle V2 to pass by can be calculated by using them together with the vehicle speed SV1 of the host vehicle V1 and the distance Ls between the right front side sensor 13 and the right rear side sensor 14. That is, the predicted time Tp can be calculated by dividing the sum of the length L2 and the distance Ls by the relative speed obtained by adding the vehicle speed SV1 of the host vehicle V1 and the vehicle speed SV2 of the other vehicle V2 together.

Next, the moving object determining process carried out by the moving object determination unit 26 of the parking support system 1 configured as described above will be described with reference to the flowchart shown in FIG. 6. For example, when an activation switch (not shown) such as an ignition switch provided in the host vehicle V1 is turned on, the moving object determination unit 26 carries out the moving object determining process every predetermined control cycle period.

First, in step S100, it is determined whether a first sensor has detected an object. The first sensor refers to any one of the side sensors 11 to 14, and when an object is detected by one of them and a detected distance is generated, the answer of this step is YES. The one of the side sensors 11 to 14 that detected an object is set as the first sensor, and the other side sensor on the same side is set as the second sensor.

For example, in the example of FIG. 4 described above, when the right front side sensor 13 detects the other vehicle V2 as an object and generates a detected distance, the right front side sensor 13 is set as the first sensor and the right rear side sensor 14 is set as the second sensor. When the answer of step S100 is YES, the process proceeds to step S105, and when the answer is NO, the process returns to step S100.

In step S105, it is determined whether the second sensor has detected an object. When an object is detected by the second sensor set in step S110 and a detected distance is generated, the answer of this step is YES, and when an object is not detected, the answer is NO and the process returns to step S100.

In step S110, it is determined whether the objects detected by the first and second sensors are the same object. As shown in FIG. 5 described above, when objects are detected by the first and second sensors, the distances to the objects detected by the first and second sensors are obtained. When the objects detected by the first and second sensors are the same object, the difference ΔD between the detected distances obtained by the first and second sensors will be somewhat small. Therefore, in step S110, it is determined that the objects are the same object when the absolute value of the difference ΔD is equal to or smaller than a predetermined threshold, and that the objects are not the same object when it exceeds the threshold. When the answer of this step is YES, the process proceeds to step S115, and when the answer is NO, the process returns to step S100.

It is possible that the detected distance is a distance to the front bumper or the rear bumper of the other vehicle V2 instead of its side surface. Therefore, it is preferable to calculate the difference ΔD between values that can be considered to represent distances to the side surface, for example, as shown in FIG. 5, between values selected when they became substantially constant, or between the lowest values.

In step S115, it is determined whether the steering angle detected by the steering angle sensor 16 and transmitted from the position calculation unit 25 is smaller than a predetermined steering angle during the detection by either the first or second sensor. When the steering angle is equal to or greater than the predetermined steering angle, it may not be possible to accurately determine whether the object is a moving object or a stationary object. Therefore, in such a case, the process returns to step S100 in order not to perform the step of determining whether the object is a moving object or a stationary object.

Figure 7:
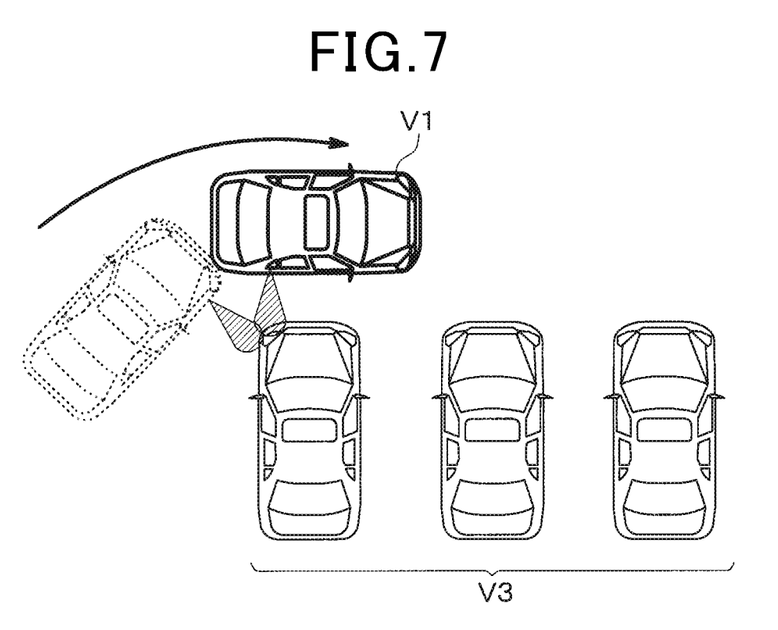
FIG. 7 shows an example of a situation where the steering angle is equal to or greater than a predetermined angle, and it may not be possible to correctly determine whether the object is a moving object or a stationary object.

The situation shown in FIG. 7 is considered as an example. The host vehicle V1 was on the left side of a parked vehicle V3, and it is turning right so that it will be in front of the parked vehicle. In such a case, first, the right front side sensor 13 detects the parked vehicle V3, and the right rear side sensor 14 detects the parked vehicle V3 afterwards. The right front side sensor 13 detects the parked vehicle V3 while the host vehicle is turning, and the part of the parked vehicle V3 detected first is the left front corner. The right rear side sensor 14 detects the parked vehicle V3 after the host vehicle has finished turning, and it may first detect the front of the parked vehicle V3. Therefore, the part of the parked vehicle V3 detected by the right front side sensor 13 differs from the part detected by the right rear side sensor 14. In such a situation, a stationary object may be erroneously determined to be a moving object, which prevents the system from correctly determining whether an object is a moving object or a stationary object.

Thus, as shown in step S115, whether the object is a moving object or a stationary object is not determined when the steering angle is equal to or greater than a predetermined steering angle.

In this example, it is assumed that the steering angle has become equal to or greater than the predetermined steering angle during the detection by the first and second sensors in step S115. However, this is only an example, and when the steering angle becomes equal to or greater than the predetermined steering angle, whether the object is a moving object or a stationary object may not be determined until the vehicle travels for a predetermined time or a predetermined distance. Further, when the steering angle is large and this increases the difference ΔD between the detected distances of the first and second sensors, whether the object is a moving object or a stationary object may not be determined as a result of the answer of step 110 being NO.

In the subsequent step S120, the vehicle speed SV2 and length L2 of the other vehicle V2 are calculated. They are calculated as described above. Then, the process proceeds to step S125 to calculate the predicted time Tp it takes for the other vehicle V2 to pass by, and the process further proceeds to step S130 to calculate the time difference between the real time Tj and the predicted time Tp. The real time Tj refers to the time it actually took for the other vehicle V2 to pass by the host vehicle, and the actual time it took from when the other vehicle V2 has been detected by the first sensor until the other vehicle V2 has no longer been detected by the second sensor is measured.

After that, the process proceeds to step S135 to determine whether the time difference between the real time Tj calculated in step S130 and the predicted time Tp is equal to or greater than a predetermined value. That is, if the real time Tj is equal to or less than the predicted time Tp, it is considered that the other vehicle V2 is still a moving object, but if the real time Tj is longer than the predicted time Tp, the other vehicle V2 may have stopped while it was passing by the host vehicle. Therefore, when the time difference between the real time Tj and the predicted time Tp is equal to or greater than a predetermined value, the process proceeds to step S140 in which it is assumed that the other vehicle V2 has become a stationary object. When the time difference between the real time Tj and the predicted time Tp is smaller than the predetermined value, the process proceeds to step S145 in which the other vehicle V2 is recognized as a moving object.

The predetermined time is set so that it allows for a margin for the case where the vehicle speed SV2 of the other vehicle V2 decreases. If no margin is taken into account, the predetermined time may be 0, and if a margin is taken into account, a time period corresponding to the margin is set as the predetermined time.

In this way, it is possible to determine whether the moving other vehicle V2 is still a moving object or has stopped moving and changed to a stationary object. Therefore, when the obstacle recognition unit 27 recognizes presence of an obstacle object, information indicating whether the object is a moving object or a stationary object is added based on the result of determination of whether the object is a moving object or a stationary object transmitted from the moving object determination unit 26. The support control unit 28 performs parking support control so that the vehicle can be parked avoiding obstacles based on the information on the obstacles transmitted from the obstacle recognition unit 27.

As described above, in the parking support system according to the present embodiment, when another vehicle V2 that has been moving stops while it is passing by the host vehicle, the moving object determination unit 26 of the parking support ECU 20 can correctly recognize that it has become a stationary object. Specifically, the detection results of two side sensors placed at a certain distance from each other on one side of the host vehicle are used to calculate the vehicle speed SV2 and the length L2 of the other vehicle V2, and further the predicted time Tp it takes for the other vehicle V2 to pass by the host vehicle V1 is calculated. The real time Tj it actually took for the other vehicle V2 to pass by is compared with the predicted time Tp, and if the real time Tj is longer than the predicted time Tp by a predetermined time or more, it can be determined that the object has become a stationary object.

Thus, it is possible to correctly determine that an object is a stationary object even when a moving object becomes a stationary object in moving. Further, since the system can correctly determine that an object is a stationary object when the object stops moving, it is possible to prevent generation of an erroneous route or an uncontrolled state where no control is performed. Although an instance where a moving object becomes a stationary object is detected in this example, it is also possible to identify an object that has been a stationary object from the beginning as a stationary object, because if the vehicle speed VS2 is 0 in step S120, the object can be determined to be a stationary object at that point.

OTHER EMBODIMENTS

Although the present disclosure has been described based on the above embodiment, the present disclosure is not limited to the embodiment, and it encompasses various modifications and equivalents. In addition, the scope and the spirit of the present disclosure encompass various combinations and modes, and other combinations and modes including only one element thereof, or more or less elements.

(1) For example, in the above embodiment, a case where each of the side sensors 11 to 14 is oriented in a direction perpendicular to the side surfaces of the vehicle, that is, oriented so that the lateral direction of the vehicle corresponds to the center of the detection area in the width direction was described as an example. However, their orientation does not necessarily have to coincide with the lateral direction. For example, the front side sensors may be oriented diagonally forward. In this case, the distance between the front side sensor and the rear side sensor aligned in the traveling direction on each side surface of the vehicle may be corrected according to their orientations and the detected distances.

(2) In the above embodiment, a case where the host vehicle V1 moves forward has been given as an example, but it is also possible to determine whether the other vehicle V2 is a moving object in the same way when the host vehicle V1 moves backward. For example, when the host vehicle V1 is moving backward, another vehicle V2 facing the same direction as the host vehicle V1 may pass by the host vehicle V1 on its right side. In such a case, the first sensor corresponds to the right rear side sensor 14 and the second sensor corresponds to the right front side sensor 13, and the vehicle speed SV2 of the other vehicle V2 is calculated based on the time Te shown in FIG. 5. The length L2 of the other vehicle V2 can be calculated by calculating the amount of movement Y1 of the host vehicle V1 during the time Tr, and calculating the difference between the amount of movement Y2 of the other vehicle V2 during the time Tr and the amount of movement Y1 of the host vehicle V1.

(3) In the above embodiment, a case where the host vehicle V1 and the other vehicle V2 move in opposite directions has been given as an example, but the same applies even if they move in the same direction. In that case, the predicted time Tp is the time it takes for the other vehicle V2 to overtake the host vehicle V1. Once the vehicle speed SV2 and the length L2 of the other vehicle V2 are obtained, the predicted time Tp it takes for the other vehicle V2 to pass by can be calculated by using them together with the vehicle speed SV1 of the host vehicle V1 and the distance Ls between the right front side sensor 13 and the right rear side sensor 14. That is, the predicted time Tp can be calculated by dividing the sum of the length L2 and the distance Ls by the relative speed obtained by subtracting the vehicle speed SV1 of the host vehicle V1 from the vehicle speed SV2 of the other vehicle V2.

(4) In the first embodiment, another vehicle V2 is used as an example of an obstacle that may be a moving object, but it is also possible to similarly determine whether an obstacle other than another vehicle V2 is a moving object or a stationary object, such as a motorcycle, a small car, or a pedestrian. In the first embodiment, the traveling speed of the obstacle is described as vehicle speed SV2 since another vehicle V2 is used as an example of an obstacle, but the vehicle speed SV2 corresponds to the traveling speed of the obstacle.

(5) In the first embodiment, in step S135, the time difference between the real time Tj and the predicted time Tp is compared with a predetermined value. However, when the other vehicle V2 stops moving or when the other vehicle V2 is a large vehicle, the other vehicle V2 may not exit the detection area of the first or second sensor for a long time, and the predicted time Tp or the actual time Tj may not be calculated. Taking such a case into consideration, the process may proceed to step S140 and determine that the object has become a stationary object when the elapsed time since the detection of the other vehicle V2 by the first sensor becomes equal to or longer than an extended time set to be longer than a predicted time Tp for a standard-size vehicle or a predicted time Tp that has already been calculated. The extended time may be a value obtained by adding the predetermined time used as a criterion in step S135 to the predicted time Tp, or may be set to any appropriate time. Providing such an extended time makes it possible to cope with cases where the other vehicle V2 is not a standard-size vehicle but a large vehicle such as a truck.

Figure 6:
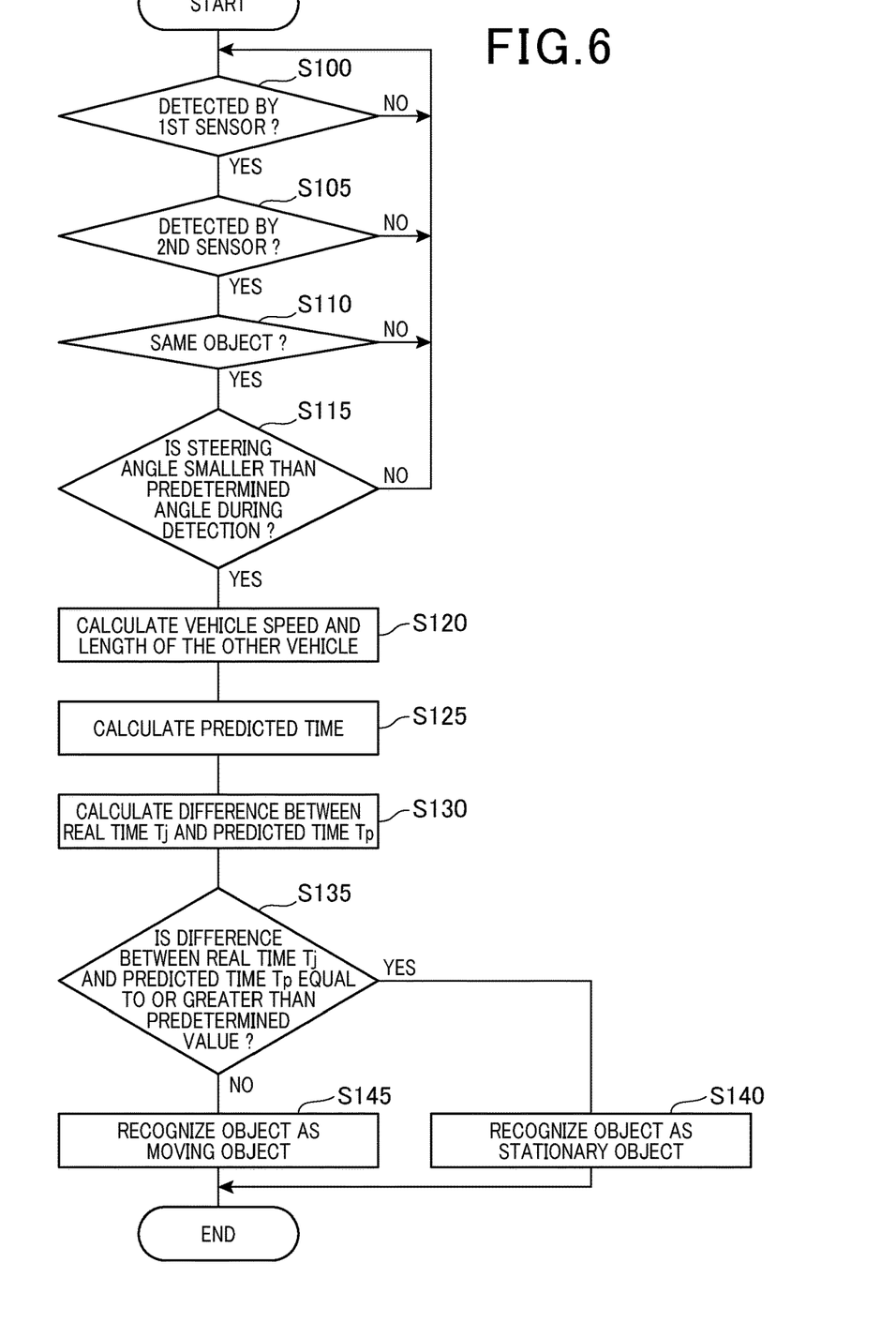
FIG. 6 is a flowchart showing the moving object determining process in detail.

(6) The steps shown in FIG. 6 correspond to functional units that carries out various operations. That is, the part that performs the operation of step S100 corresponds to a first determination unit, the part that performs the operation of step S105 corresponds to a second determination unit, and the part that performs the operation of step S110 corresponds to an identity determination unit. Further, the part that performs the operation of step S115 corresponds to a steering angle determination unit, the part that performs the operation of step S120 corresponds to a speed calculation unit and a length calculation unit, and the part that performs the operation of step S125 corresponds to a predicted time calculation unit. The part that performs the operation of step S130 corresponds to a time difference calculation unit, and the part that performs the operation of step S135 corresponds to a moving/stationary determination unit.

The control units and their methods described herein may be realized by a dedicated computer provided by configuring a processor and a memory programmed to execute one or more functions embodied by computer programs. Alternatively, the control units and their methods described herein may be realized by a dedicated computer provided by configuring a processor with one or more dedicated hardware logic circuits. Alternatively, the control units and their methods described herein may be realized by one or more dedicated computers configured by combining a processor and a memory programmed to execute one or more functions with a processor configured by one or more hardware logic circuits. The computer programs may be stored in a computer-readable non-transitory tangible recording medium as instructions executed by the computer.

What is claimed is:

1. A moving object determination device applied to a vehicle, comprising:
    at least one memory having a set of computer-executable instructions stored thereon;
    at least one processor communicable with the memory and an on-vehicle device; and
    the set of computer-executable instructions stored on the memory cause the processor to implement:
    determining whether an obstacle is initially detected by only a first sensor of at least two ultrasonic sensors that are aligned in a traveling direction of the vehicle on one side of the vehicle with a predetermined distance between them and configured to detect the obstacle on the one side, the at least two ultrasonic sensors comprising the first sensor and a second sensor;
    determining whether the obstacle has been detected by the second sensor which is the other of the at least the two ultrasonic sensors and did not detect the object;
    calculating a traveling speed of the obstacle based on (i) an elapsed time from when the first sensor initially detected the obstacle to when the second sensor detects the obstacle, and (ii) the predetermined distance;
    calculating a length of the obstacle based on the traveling speed and a detecting time, the detecting time being from when the first sensor started to detect the obstacle until the obstacle has no longer been detected by the first sensor;
    calculating a predicted time from when the obstacle is initially detected by the first sensor to when the obstacle will no longer be detected by the second sensor based on the traveling speed and the length of the obstacle;
    calculating a real time from when the obstacle is initially detected by the first sensor to when the obstacle has no longer been detected by the second sensor, and calculates a time difference between the real time and the predicted time; and
    determining that the obstacle is a stationary object in response to the time difference being equal to or greater than a predetermined value, and determines that the obstacle is a moving object in response to the time difference being smaller than the predetermined value,
    wherein:
    the vehicle comprises a braking control device and a driving force control device, the braking control device controlling a braking force of each wheel of the vehicle, driving force control device controlling a driving force of each drive wheel of the vehicle; and
    the processor transmits a control signal to at least one of the braking control device and the driving force control device to move the vehicle according to a route for moving the vehicle avoiding the obstacle based on determining whether the obstacle is a stationary object or a moving object.

2. The moving object determination device according to claim 1, wherein the set of computer-executable instructions further cause the processor to implement:
    determining whether the obstacles detected by the first and second sensors are the same object, and
    wherein the set of computer-executable instructions further cause the processor to implement not determining whether the obstacle is the moving object or the stationary object in response to not determining that the obstacles are the same object.

3. The moving object determination device according to claim 2, wherein
the set of computer-executable instructions further cause the processor to implement not determining that the obstacles are the same object in response to an absolute value of a difference between a first detected distance to the obstacle detected by the first sensor and a second detected distance to the obstacle detected by the second sensor being equal to or smaller than a predetermined threshold.

4. The moving object determination device according to claim 1, wherein the set of computer-executable instructions further cause the processor to implement:
determining whether a steering angle of the vehicle is equal to or greater than a predetermined steering angle during detection of the obstacle by the first sensor and detection of the obstacle by the second sensor, and
wherein in response to determining that the steering angle of the vehicle is equal to or greater than the predetermined steering angle, the set of computer-executable instructions further cause the processor to implement not determining whether the obstacle is the moving object or the stationary object.

5. The moving object determination device according to claim 1, wherein the set of computer-executable instructions further cause the processor to implement:
determining whether a steering angle of the vehicle is equal to or greater than a predetermined steering angle, and
wherein in response to determining that the steering angle of the vehicle is equal to or greater than the predetermined steering angle, the set of computer-executable instructions further cause the processor to implement not determining whether the obstacle is the moving object or a stationary object until the vehicle travels for a predetermined time or travels a predetermined distance.

6. The moving object determination device according to claim 1, wherein
when the obstacle continues to be detected by the first or second sensor after the obstacle is detected by the first sensor, the set of computer-executable instructions further cause the processor to implement determining that the obstacle is the stationary object in response to an elapsed time from when the obstacle has been detected by the first sensor exceeding an extended time set to be longer than the predicted time.

7. A method for a vehicle to determine whether an obstacle is a stationary object or a moving object comprising:
determining whether the obstacle is initially detected by only a first sensor of at least two ultrasonic sensors that are aligned in a traveling direction of the vehicle on one side of the vehicle with a predetermined distance between them and configured to detect the obstacle on the one side, the at least two ultrasonic sensors comprising the first sensor and a second sensor;
determining whether the obstacle has been detected by the second sensor which is the other of the at least the two ultrasonic sensors and did not detect the object;
calculating a traveling speed of the obstacle based on (i) an elapsed time from when the first sensor initially detected the obstacle to when the second sensor detects the obstacle, and (ii) the predetermined distance;
calculating a length of the obstacle based on the traveling speed and a detecting time, the detecting time being from when the first sensor started to detect the obstacle until the obstacle has no longer been detected by the first sensor;
calculating a predicted time from when the obstacle is initially detected by the first sensor to when the obstacle will no longer be detected by the second sensor based on the traveling speed and the length of the obstacle;
calculating a real time from when the obstacle is initially detected by the first sensor to when the obstacle has no longer been detected by the second sensor, and calculates a time difference between the real time and the predicted time; and
determining that the obstacle is a stationary object in response to the time difference being equal to or greater than a predetermined value, and determines that the obstacle is a moving object in response to the time difference being smaller than the predetermined value, wherein:
the vehicle comprises a braking control device and a driving force control device, the braking control device controlling a braking force of each wheel of the vehicle, driving force control device controlling a driving force of each drive wheel of the vehicle; and
the method further comprises transmitting a control signal to at least one of the braking control device and the driving force control device to move the vehicle according to a route for moving the vehicle avoiding the obstacle based on determining whether the obstacle is a stationary object or a moving object.

8. A non-transitory computer-readable medium having computer-executable instructions for a vehicle to determine whether an obstacle is a stationary object or a moving object, the computer-executable instructions comprising instructions for:
determining whether the obstacle is initially detected by only a first sensor of at least two ultrasonic sensors that are aligned in a traveling direction of the vehicle on one side of the vehicle with a predetermined distance between them and configured to detect the obstacle on the one side, the at least two ultrasonic sensors comprising the first sensor and a second sensor;
determining whether the obstacle has been detected by the second sensor which is the other of the at least the two ultrasonic sensors and did not detect the object;
calculating a traveling speed of the obstacle based on (i) an elapsed time from when the first sensor initially detected the obstacle to when the second sensor detects the obstacle, and (ii) the predetermined distance;
calculating a length of the obstacle based on the traveling speed and a detecting time, the detecting time being from when the first sensor started to detect the obstacle until the obstacle has no longer been detected by the first sensor;
calculating a predicted time from when the obstacle is initially detected by the first sensor to when the obstacle will no longer be detected by the second sensor based on the traveling speed and the length of the obstacle;
calculating a real time from when the obstacle is initially detected by the first sensor to when the obstacle has no longer been detected by the second sensor, and calculates a time difference between the real time and the predicted time; and
determining that the obstacle is a stationary object in response to the time difference being equal to or greater than a predetermined value, and determines that the obstacle is a moving object in response to the time difference being smaller than the predetermined value, wherein:

the vehicle comprises a braking control device and a driving force control device, the braking control device controlling a braking force of each wheel of the vehicle, driving force control device controlling a driving force of each drive wheel of the vehicle; and the computer-executable instructions further comprises instructions for: transmitting a control signal to at least one of the braking control device and the driving force control device to move the vehicle according to a route for moving the vehicle avoiding the obstacle based on determining whether the obstacle is a stationary object or a moving object.

\* \* \* \* \*